US009635445B1

(12) United States Patent
Ridley

(10) Patent No.: US 9,635,445 B1
(45) Date of Patent: Apr. 25, 2017

(54) PORTABLE ENTERTAINMENT AND COMMUNICATIONS SYSTEM

(71) Applicant: Shannon Ridley, Palmetto Bay, FL (US)

(72) Inventor: Shannon Ridley, Palmetto Bay, FL (US)

(73) Assignee: Ridley 517 IP, LLC, Fort Lauderdale, FL (US)

( * ) Notice: Subject to any disclaimer, the term of this patent is extended or adjusted under 35 U.S.C. 154(b) by 0 days.

(21) Appl. No.: 15/008,680

(22) Filed: Jan. 28, 2016

(51) Int. Cl.
*H04R 1/02* (2006.01)
*G06F 3/16* (2006.01)
*G08B 13/14* (2006.01)

(52) U.S. Cl.
CPC ............. *H04R 1/028* (2013.01); *G06F 3/162* (2013.01); *G08B 13/1472* (2013.01); *H04R 1/023* (2013.01); *H04R 2201/023* (2013.01); *H04R 2420/07* (2013.01)

(58) Field of Classification Search
CPC ... A45C 11/00; A45C 5/04; A45F 5/00; A45F 3/04; A63H 3/28; A63H 3/36; G08B 21/0269; H04R 1/02; H04R 5/02
USPC ......................................... 381/388, 301, 333
See application file for complete search history.

(56) References Cited

U.S. PATENT DOCUMENTS

| | | | | |
|---|---|---|---|---|
| 5,147,986 A | 9/1992 | Cockrum | | |
| D460,614 S | 7/2002 | Reimers et al. | | |
| D469,952 S | 2/2003 | Daglow et al. | | |
| 6,712,249 B2 | 3/2004 | Magnusson et al. | | |
| 6,883,693 B2 | 4/2005 | Han | | |
| 7,035,422 B1 * | 4/2006 | Wiener | H04R 1/025 | 381/301 |
| 7,292,823 B2 | 11/2007 | Kuo | | |
| 7,440,581 B2 | 10/2008 | Wiener | | |
| 7,668,571 B2 | 2/2010 | Na et al. | | |
| 8,446,126 B2 | 5/2013 | Cheng | | |
| 8,879,759 B2 | 11/2014 | Wells | | |
| 2002/0176593 A1 * | 11/2002 | Magnusson | H04R 5/023 | 381/301 |
| 2006/0251284 A1 * | 11/2006 | Wiener | H04R 5/023 | 381/388 |

(Continued)

FOREIGN PATENT DOCUMENTS

| | | |
|---|---|---|
| CN | 202334862 | 7/2012 |
| CN | 202799092 | 3/2013 |

(Continued)

*Primary Examiner* — Mohammad Islam

(57) ABSTRACT

A backpack having a lining inside the backpack and a speaker compartment below the lining. The speaker compartment is configured to receive a speaker assembly configured to emit sound out of both the side and outward facing sections of the backpack. The speaker assembly is configured for communicatively coupling with a remote computing device. A subwoofer grille covers an opening on each side section of the backpack, and wherein each subwoofer grille is configured to couple the speaker assembly to the side section of the backpack. A pair of tweeter grilles covers openings on the outward facing section of the backpack and each tweeter grille is configured to couple the speaker assembly to the backpack. The system also includes a remote controlling device concealed within one of the straps of the backpack for controlling the speaker assembly and alarm.

20 Claims, 7 Drawing Sheets

(56) References Cited

U.S. PATENT DOCUMENTS

| | | | | |
|---|---|---|---|---|
| 2007/0045369 | A1 | 3/2007 | Chen | |
| 2007/0262104 | A1 | 11/2007 | Chen | |
| 2008/0156575 | A1 | 7/2008 | Entner | |
| 2008/0165997 | A1 * | 7/2008 | Skurdal | H04R 5/023<br>381/334 |
| 2008/0187166 | A1 * | 8/2008 | Ko | H04R 5/023<br>381/388 |
| 2009/0154737 | A1 | 6/2009 | Ostler et al. | |
| 2009/0305600 | A1 * | 12/2009 | Roesch | A63H 3/003<br>446/72 |
| 2010/0078457 | A1 | 4/2010 | Pitchford | |
| 2010/0202627 | A1 | 8/2010 | Gray | |
| 2012/0300962 | A1 | 11/2012 | Devoto | |
| 2014/0098979 | A1 | 4/2014 | Osborn | |
| 2015/0041511 | A1 * | 2/2015 | Powell | A45C 13/18<br>224/576 |
| 2015/0078579 | A1 * | 3/2015 | Lopez | H04R 5/02<br>381/81 |
| 2015/0139464 | A1 * | 5/2015 | Guo | H04R 1/02<br>381/334 |

FOREIGN PATENT DOCUMENTS

| | | | | |
|---|---|---|---|---|
| CN | 203167188 | | 8/2013 | |
| CN | 203748836 | | 8/2014 | |
| CN | 204408582 | | 6/2015 | |
| CN | 204442637 | | 7/2015 | |
| GB | 2415125 | A * | 12/2005 | A45C 15/00 |
| WO | 2008010138 | A3 | 4/2008 | |

* cited by examiner

PORTABLE ENTERTAINMENT AND COMMUNICATIONS SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of entertainment and communications systems, and more specifically to the field of backpack and mobile entertainment and communications systems.

BACKGROUND

People around the world have enjoyed music for thousands of years. As time progressed, people began to use speakers in order to play music for enjoyment, educational purposes as well as for a variety of other reasons. As time progressed, entertainment systems were developed to include the various components required to reproduce sound and music.

Throughout periods of history entertainment systems have included record players, cassette players, and CD players. More recently, entertainment systems use remote computing devices, such as cellular telephones, tablets, smart phones, tablet computers, desktop computers, laptops, and game consoles, for example, to play music. In the past, devices have been developed to add speakers to backpacks to allow for the increased portability of entertainment systems.

Devices that disclose speakers utilized with backpacks include U.S. Pat. No. 6,712,249 to Tony Mangusson et al. U.S. Pat. No. 6,712,249 discloses a backpack entertainment with detachable pockets. However, U.S. Pat. No. 6,712,249 fails to discloses or provide a system that provides adequate amount of sound that can be emitted from the backpack. The device is limited to one speaker on each side. Such an embodiment does not allow for adequate sound quality.

U.S. Pat. No. 6,993,693 to Han et al. also discloses a backpack having speakers arranged so that a speaker emits sound from the sides of the backpack. However, similar to U.S. Pat. No. 6,712,249, U.S. Pat. No. 6,993,693 fails to disclose a structure that allows for optimized sound quality.

As a result, there exists a need for improvements over the prior art and more particularly for a better backpack for housing a portable entertainment and communications system.

SUMMARY

A portable entertainment and communications system integrated within a backpack is disclosed. This Summary is provided to introduce a selection of disclosed concepts in a simplified form that are further described below in the Detailed Description, including the drawings provided. This Summary is not intended to identify key features or essential features of the claimed subject matter. Nor is this Summary intended to be used to limit the claimed subject matter's scope.

In one embodiment, a portable entertainment and communications system is disclosed. The system includes a backpack comprising a main opening and a pair of straps. The backpack is configured for a user to wear on the user's back. A lining inside the backpack comprises an inward facing surface and includes at least one compartment configured for receiving items. The backpack includes a speaker compartment positioned inside the backpack below the lining. The speaker compartment is configured to receive a speaker assembly. The speaker assembly includes a rectangular shaped speaker assembly positioned inside the speaker compartment and configured for producing audio. The speaker assembly is configured to emit sound from both the side and outward facing sections of the housing thereby providing a true stereo sound or more realistic sound when perceived by a listener. The speaker assembly is configured to be communicatively coupled with a remote computing device. The remote computing device may be configured for wireless communication or to be conductively coupled with the processor of the speaker assembly. The remote computing device may also be configured to receive and transfer sound data to the processor of the speaker assembly.

The speaker assembly includes a.) a rectangular shaped housing configured to be positioned inside the speaker compartment; b.) a subwoofer coupled to each side section of the housing, wherein each subwoofer is configured to emit sound out of each side section of the housing and not out of the outward facing section of the housing; c.) at least two tweeters positioned on an outward facing section of the housing, wherein each tweeter is configured to emit sound out of the outward facing section of the housing; d.) at least two air channels, wherein each channel is configured to allow air to flow between the inside and outside of the housing; e.) a processor inside the housing, wherein the processor is configured for processing audio to be emitted from the subwoofers and tweeters; f) a user interface station disposed on the housing, wherein the user interface station includes a USB port, wherein the USB port is configured for interfacing with a USB connection, and a plurality of audio ports, wherein the audio ports are configured for receiving audio in and audio out connections; g.) a battery inside the housing, wherein the battery is configured for providing electrical power; h) a plurality of openings disposed are on the backpack, wherein the openings are configured to align with the subwoofers, tweeters, air channels and docking station of the speaker assembly; i) a pair of subwoofer grilles, wherein each subwoofer grille covers one of the openings corresponding to one of the subwoofers of the speaker assembly, and wherein each subwoofer grille is configured to couple each side section of the speaker assembly to the side section of the backpack; j) a pair of tweeter grilles, wherein each tweeter grille covers one of the openings corresponding to one of the tweeters of the speaker assembly, and wherein each tweeter grille is configured to couple the outward facing section of the speaker assembly to the outward facing section of the backpack.

The system also includes a remote controlling device concealed within one of the straps of the backpack, wherein the remote controlling device is communicatively coupled with the speaker assembly inside the backpack and is configured for at least controlling the power and volume of the speakers; and an alarm controlling device concealed within one of the straps of the backpack, wherein the alarm controlling device is communicatively coupled with the speaker assembly inside the backpack and is configured for activating an alarming sound emitted from said speakers.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 2 also illustrates components inside a speaker compartment of the system, according to an example embodiment;

FIG. 3 also illustrates the direction and level of frequencies of sound that are emitted from the system, according to an example embodiment;

DETAILED DESCRIPTION

Figure 1:
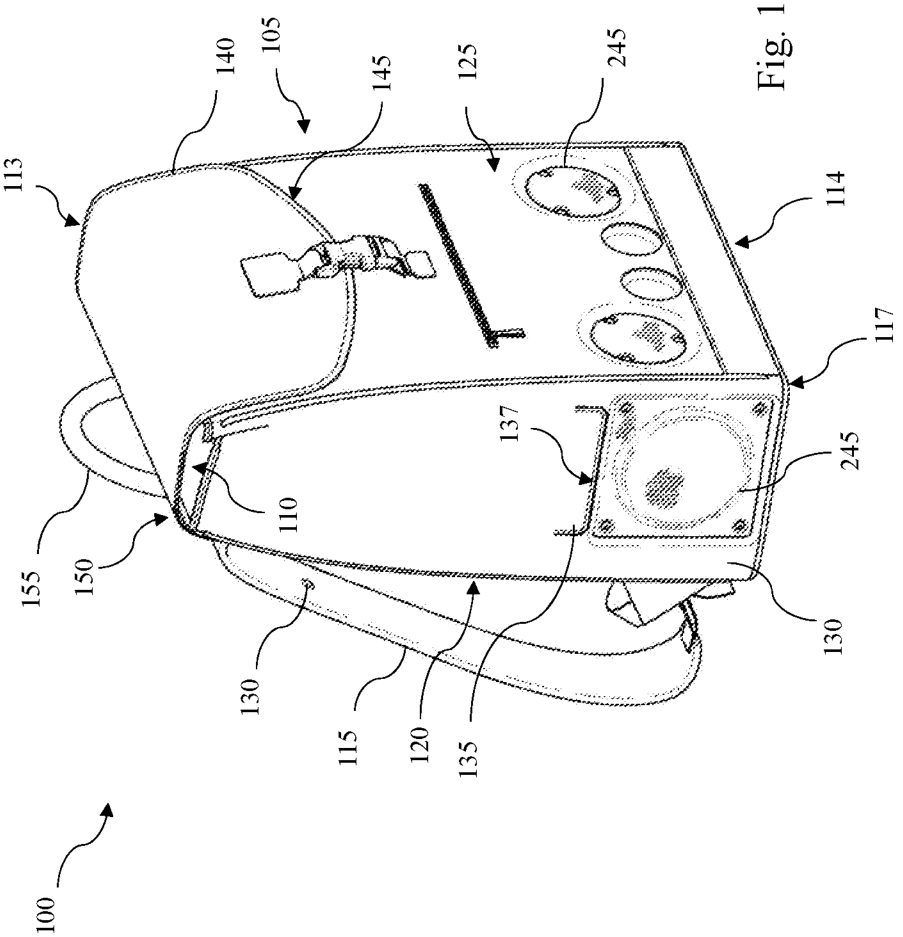
FIG. 1 is a perspective view a portable entertainment system, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a portable entertainment system. The portable entertainment system provides a means for providing improved sound quality or a truer stereo sound by having the subwoofers emit sound out of the sides of the backpack and not out of the outward facing side of the backpack. The backpack also provides a remote handheld controller communicatively coupled to the speaker assembly and hidden within a backpack strap for easily controlling the system. The backpack also provides an alarm controlling device communicatively coupled to the speaker assembly and hidden within a backpack strap for emitting an alarming sound when needed. The system uses speaker grills affixed to a portion of the backpack near the bottom of the backpack. The system also improves over the prior art by providing a battery with long life that may also charge and power other devices. The backpack also includes rounded corners which provide additional support and structure to the backpack and to prevent damage to the surface of the material of the backpack.

Referring now to the Figures, FIG. 1, illustrates the portable entertainment system 100. The system includes a backpack 105 having a main opening 110 that is covered by a main flap 140. The backpack is configured to be worn on a wearer's back. In this document, the term "backward" refers to the side that would be proximate to a wearer's back if worn by the wearer. The term "outward" refers to the side that would be opposing or opposite to a wearer's back when worn. The material of the bag or backpack and straps may comprise material that is commonly used for fabricating backpacks and may include leather, nylon, canvas, polyester, plastics, polymers, fibers, cloth, wood or any combination thereof. Additionally, other materials may be used and are within the spirit and scope of the invention.

The main opening 100 can have a variety shapes and sizes. In the present embodiment, the main opening is a substantially rectangular shape providing access to the interior of the backpack from above the backpack. The main flap covers the main opening. In the present embodiment, the main flap comprises a trapezoidal shape. However, in other embodiments various types of other shapes may also be used. A first end 150 of the main flap is attached to the backward facing surface 120 proximate to the upper end 113 of the backpack. The body of the main flap covers the main opening and the second end 145 of the main flap can be removably attached to the outward facing surface 125 of the backpack by a buckle. However, other types of fasteners, such as a zipper, hook and loop fastener, snaps, cinching mechanisms or any combination thereof may also be used and are within the spirit and scope of the present invention.

Attached are proximate to the upper end of the backpack is a handle 155. In the present embodiment, the handle is a U-shaped body having a first end and a second that is attached to the backward facing side of the backpack. However, in other embodiments the handle maybe also attached to other surfaces of the backpack. The handle may comprise material, such as leather, Cordura® Nylon, (Kodra Nylon, or other Nylon fabrics), canvas, cloth, polyester, plastic, fiber, wood, metal, glass, etc., or any combination thereof. Such materials are well known to those skilled in the art and other materials may be used and are within the spirit and scope of the invention.

A pair of straps 115 is attached to the backward facing surface of the backpack. One end of the strap is attached proximate to the upper end 113 of the backpack and a second end is attached to the lower end 114 of the backpack. In the present embodiment, the second ends of the straps are attached to the lower end of the backpack by a cinching mechanism. However, other methods of attaching the strap to the lower end of the backpack may also be used and are within the spirit and scope of the present invention.

Towards the lower end of the backpack, are speaker grills, 245, 250 (further explained below and illustrated in subsequent figures), which attach to a speaker housing that contains a speaker assembly inside the backpack. The lower end of the backpack may also have rounded corners 117, which provide additional support and structure to the backpack and are configured such that the rounded corners prevent damage to the surface of the material of the backpack. The rounded corners may also comprise material that is more sturdy or thicker than the remainder of the backpack such that the corners of the lower end 114 of the backpack are not easily torn or otherwise damaged.

Figure 2:
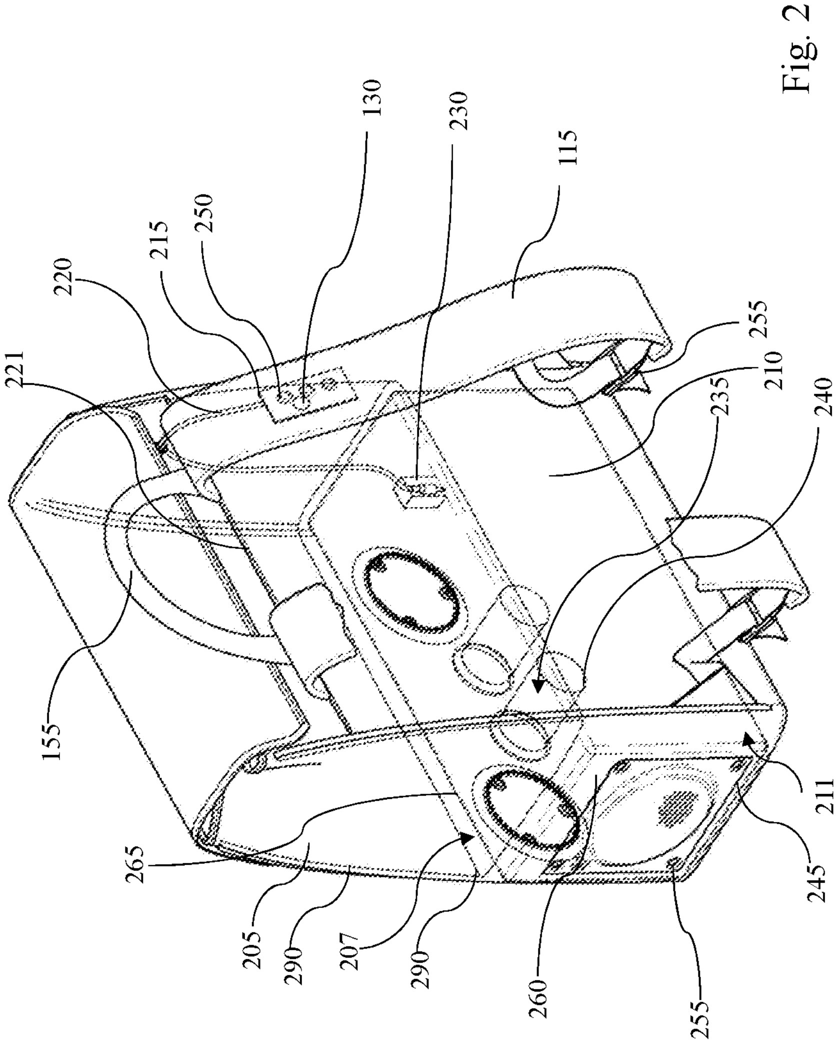
FIG. 2 is top perspective view of the backward facing section of a backpack of the portable entertainment system with a main flap closed.
Figure 3:
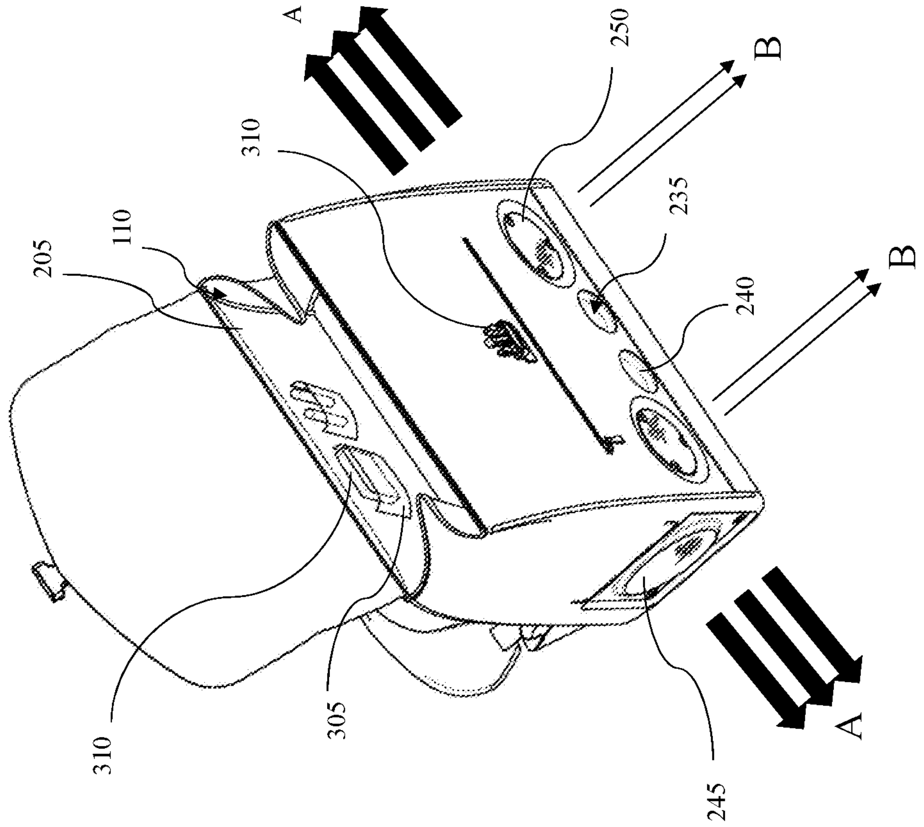
FIG. 3 is top perspective view of the system with the main flap open illustrating a plurality of compartments or pockets on inward facing surfaces of a lining of the backpack.

FIGS. 2 and 3 will be discussed together. In FIG. 2, the main flap 140 is closed and in FIG. 3 the main flap is open. FIG. 2 is a top perspective view of the backward facing section of a backpack with the main flap closed 2 illustrating components inside the backpack. The hashed lines of FIG. 2 illustrate components inside the backpack not visible with the backpack closed. FIG. 3 is top perspective view of the backpack with a main flap of the backpack open illustrating a plurality of compartments or pockets on inward facing surfaces of a lining 205 of the backpack of the system. A lining 205 inside the backpack defines a partition above a speaker compartment 207. The lining is configured to line the inside of the backpack and to form a compartment that can be accessed through the main opening 110. The perimeter of the lining is illustrated by dotted or hashed lines 290.

In this document, the term "inward facing surface" refers to the surface(s) that may be accessed via the main opening. In operation, a user can open or close the main flap 140 such that he or she can insert items into or remove items from the inward facing surface of the lining 205 of the backpack (illustrated in FIG. 3). Attached to the inward facing surfaces of the linings of the backpack are pockets or compartments 305 for holding objects. The lining and pockets or compartments may comprise materials such as leather, Cordura® Nylon, (Kodra Nylon, or other Nylon fabrics), canvas, cloth, polyester, plastic, fiber etc., or any combination thereof. Such materials are well known to those skilled in the art and other materials may be used and are within the spirit and scope of the invention. The pockets or compartments can be configured for receiving pens, cell phones, pencils, laptop computers, tablets, tablet computers, keys, cameras, items for personal grooming, condoms, medications, food, small articles of clothing, documents or any combination thereof and other objects may be held inside of the backpack.

In the present embodiment, the backpack may also include a padding or a padded section (having cushioning properties) that spans along the backward facing surface 120 of the backpack. In the present embodiment, the thickness of the padding is represented by line 221 (illustrated in FIG. 2). The padding may provide comfort to a user when the backpack is worn on a user's back. In one embodiment, the padding may comprise foam, feathers, memory foam or other types of cushioning material. Such padding or cushioning like materials are well known to those skilled in the art. Other padding like materials may be used and are within the spirit and scope of the present invention. However, it is understood that the padding must be sufficient to decrease the amount of vibrations received by the user and emitted from the speaker assembly within the backpack.

In one embodiment, the lining 205 of the backpack defines a speaker compartment 207. The speaker compartment is positioned inside the backpack below the lining or partition and is configured to receive a speaker assembly 211. In other embodiments, a solid partition, made of wood, fiberglass, plastic, alloys, graphite, polymers, carbon fiber, aluminum, ABS plastic, hard plastic, or other materials may form a hard partition inside the backpack may define the speaker compartment 207 below the partition. In other embodiments, a combination of the lining and partition may be used. The speaker assembly includes a rectangular shaped speaker housing 210 that is adapted to fit inside of the speaker compartment. The speaker housing may comprise materials such as fiberglass, wood, alloys, graphite, polymers, Aluminum, Mylar or hard plastic, ABS plastic, or other materials or any combination thereof. Additionally, other materials may be used and are within the spirit and scope of the present invention. A subwoofer (not shown) is coupled to each side section 260 of the housing such that sound is omitted from the side sections of the housing and not out of the outward facing 265 sections of the housing. At least one tweeter is coupled to the outward facing section 265 of the housing. In the present embodiment, two tweeters (not shown) are positioned such that each tweeter emits sound outward from the outward facing section of the housing. The arrangement of the speaker assembly provides a truer stereo sound and provides sound quality that is superior to speaker assemblies and portable sound systems or other devices that emit sound from only one side or surface of an assembly.

While the actual speakers are not illustrated in FIGS. 2 and 3, FIGS. 2 and 3 do have subwoofer grilles 245 that are configured to couple to the exterior surface of the side sections of the housing and proximate to the speaker cones of the subwoofers (more fully explained below and illustrated in FIGS. 4 and 5). Similarly, tweeter grilles 250 are configured to couple to the exterior surface of the outward facing sections of the speaker housing and proximate to the speaker cones of the tweeters (more fully explained below and illustrated in FIGS. 4 and 5). Also illustrated in FIGS. 2 and 3 are two air channels 235 defined by two tubular shaped bodies 240. These tubular shaped bodies and air channels allow air to flow between inside and outside of the speaker housing to assist with the production of sound.

As mentioned above, one of the inventive aspects of this invention is the arrangement of the speakers. In the present embodiment, the position of the subwoofers is such that it provides lower frequencies of sound emitted from the side sections of the backpack when the backpack is worn on a user's back. Sound and vibrations emitted from the subwoofer speakers are transmitted in the direction of and as illustrated as line A in FIG. 3. Sound and vibrations emitted from the tweeter speakers are transmitted outward in the direction of and as illustrated as line B in FIG. 3. The sound and vibrations (line A) are of a low frequency, have a deep sound, and are emitted from the sides of the backpack (sideward) when the speaker assembly is inside the speaker compartment. The lower frequency and deeper sounds are represented by the dark thick lines of line A. The higher frequency sounds are represented by the thin lines B. In this document, the thickness of line A represent that the sound emitted from the subwoofers are deep and lower frequency sounds. In this document, the much smaller thickness of line B represent that sound emitted from the tweeters are a high-frequency sound.

In the present embodiment, the position of the subwoofers is such that it provides lower frequencies of sound emitted from the side sections of the backpack when the backpack is worn on a user's back. Such arrangement is configured such that the subwoofers emit sound from the side sections of the housing but not from the outward facing surfaces and that the tweeters emit sound from the outward facing sections of the housing. Such arrangement provides a truer stereo sound thereby providing a superior listening experience for a listener.

The speaker assembly is configured for producing audio. The speaker assembly is also configured for wireless communication with a remote computing device, such as a cellular telephone, smart phone, tablet (illustrated in FIG. 6). The present invention may also be used as an educational tool. In one embodiment, the remote computing device may also be configured to receive and transfer sound data to the processor of the speaker assembly. In one non limiting embodiment, the remote computing device may include application(s) or components that allow the remote computing device to receive and transfer sound data, similar to a microphone, and can be communicatively coupled with the processor of the speaker assembly (either wirelessly, i.e. using Bluetooth® technology). In operation, a user may speak into the microphone or into the sound receiving sensor of the remote computing device, and such operator's voice will be received by the sensor of the microphone or of the remote computing device, converted into sound data, transferred, either by wireless communication (such as by using Bluetooth® technology) or by via wired coupling, to the processor of the speaker assembly. Next, the processor of the speaker assembly will convert such sound data so that it can be amplified by the speaker assembly so that the operator's voice can be heard throughout a given area (such as a classroom, auditorium, outside area, arena, stadium, etc.).

Figure 6:
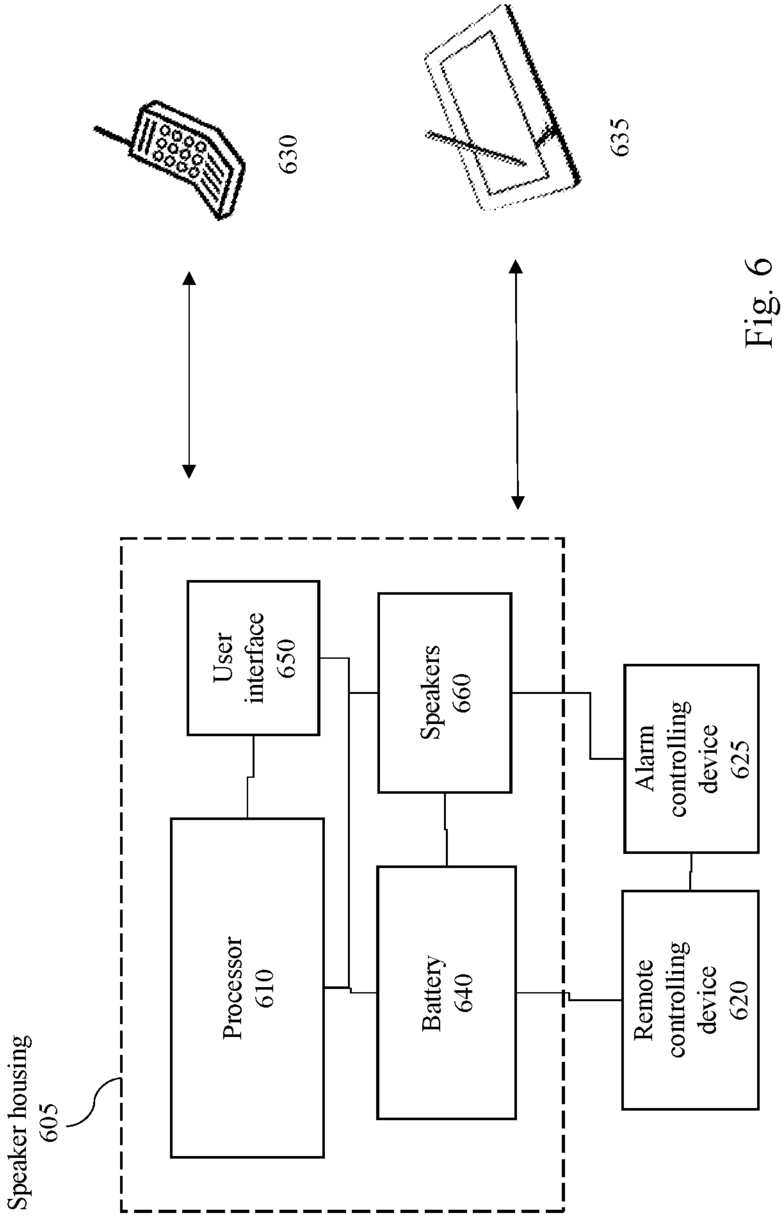
FIG. 6 is a block diagram illustrating the main electronic components of a system for a portable entertainment system, according to an example embodiment; and, FIG. 7 is a block diagram of a computing device, according to an example embodiment.

A remote controlling device 215 is concealed within the strap 115 of the backpack. The remote controlling device is communicatively coupled to the electrical components of the speaker assembly by an insulated wire 220 (as illustrated in FIG. 6 and explained below). The remote controlling device and wire may be sewn into the strap. In the present embodiment, the remote controlling device includes a plurality of buttons for controlling the volume of sound produced from the speakers as well as to control power directed from the battery (illustrated as 640 in FIG. 6) to the speakers. However, this is not meant to be a limitation and other buttons or controls and types of interfaces may also be used. The outward facing surface of the strap of the backpack may include depressions or protrusions that align with the buttons of the remote controlling device such that when a user depresses such depressions or protrusions, a force interacts with the buttons of the remote controller thereby controlling the speaker assembly.

An alarm controlling device 130 is concealed within the strap 115 of the backpack. The remote controlling device may also be communicatively coupled to the speaker assembly by an insulated wire 210. In other embodiments, a wire, cable or coupling separate from insulated wire 210 may communicatively couple the alarm controlling device to with the speaker assembly. The alarm controlling device may be sewn into the strap. The alarm controlling device may be positioned such a user would activate the alarm controlling device by pushing a portion of the inward or backward facing surface of one of the straps. The inward or backward facing surface of the strap of the backpack may include depressions or protrusions that align with the button of the alarm controlling device such that when a user depresses such depression or protrusion a force interacts with the button of the alarm controller thereby causing the speaker assembly to produce an alarming sound to be emitted from the speakers of the speaker assembly.

In the present embodiment, the wire is positioned inside the backpack and behind the lining 205 such that it does not interfere with the inward facing surface of the lining. In the present embodiment, the alarm controlling device includes at least one button for activating an alarming sound from the speakers. However, this is not meant to be a limitation and other buttons and types of interfaces may also be used.

Figure 4:
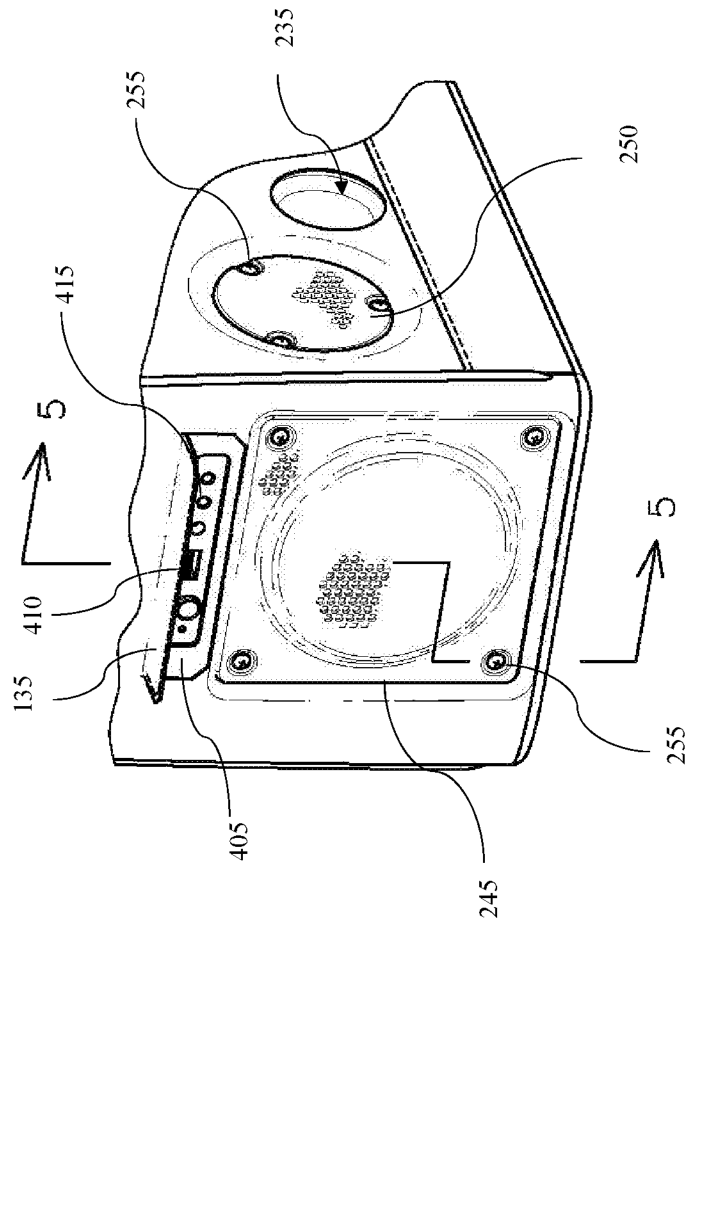
FIG. 4 is a perspective view of a portion of the side and backward facing sections of the backpack and components of a speaker assembly of the system, according to an example embodiment; and, FIG. 5 is a diagonal cross-sectional side view of a portion of the speaker assembly coupled to the backpack, according to an example embodiment.

FIG. 4 is a perspective view of a portion of the backward facing section and side sections or surfaces of the backpack illustrating components of the speaker assembly of the system, according to an example embodiment. FIG. 4 illustrates the subwoofer grille 245 and tweeter grille 250 of the speaker assembly attached to the backpack. The surface of the backpack also includes a plurality of openings disposed on the backpack that are configured to allow for speakers to project sound and vibration outward. Each of the openings are configured to align with the subwoofers, tweeters and air channels 235 when the speaker assembly is inside the speaker compartment 207. FIG. 4 illustrates one of the pair of subwoofer grilles 245, wherein the subwoofer grille covers one of the openings corresponding to one of the subwoofers of the speaker assembly. Each subwoofer grille is configured to couple one side section 130 of the speaker assembly to the side section of the backpack. FIG. 4 also illustrates one of a pair of tweeter grilles 250. Each tweeter grille covers one of the openings corresponding to one of the tweeters of the speaker assembly. Each tweeter grille is configured to couple the outward facing section 125 of the speaker assembly to the outward facing section of the backpack. Tubular shaped body 240 defining tubular channel 230 is configured to match with an opening of the material of the backpack. In one embodiment, the material of the backpack may be configured to further adhere to the sections of the speaker assembly 211 using glue or some other adhesive or securing material.

FIG. 4 also illustrates user interface station 405. The user interface station is disposed on the housing of the speaker assembly. The user interface station may include a USB port. The USB port is configured for interfacing with a USB connection. The user interface station also includes a plurality of audio ports or electrical ports, wherein the audio ports are configured for receiving an audio in and audio out connections. The USB connection is configured so that devices may be connected so that they may be charged from the battery of the device even when the speakers are not producing sound or the remainder of the device is powered off. In one embodiment, the battery is designed for providing power to the electrical components of the invention for a prolonged period of time. In one embodiment the battery is configured powering the electrical components of the present invention and other devices coupled to the system via the user interface station (410). The battery may be configured so that when the battery is fully charged it provides at least fourteen hours of power to the speaker assembly and/or to any remote computing device conductively coupled to the user interface station. It is understood that various types of batteries or power sources may be used. Additionally, it is within the spirit and scope of the invention to provide ports for conductively coupling an external power source to power the portable entertainment system as well as for charging the battery of the system.

A substantially U-shaped slit 137 may define a second flap 135. The slit is configured to be positioned over the user interface station 405 such that a user may access the user interface station. In other embodiments, fasteners may be attached to portions of the second flap so that when the user interface station is not in use it can be hidden from sight. In operation, when the speaker assembly is within the speaker compartment, a user may couple a remote device (such as a cell phone or tablet) by wire having a USB connector to the USB port 410 for charging or for powering the remote device. In one embodiment, the electrical components of the speaker assembly may include a switch or relay (or any combination or series thereof) such that a remote device may be charged or charged. It is understood that such electrical arrangements are well known to those skilled in the art and other similar arrangements are within the spirit and scope of the present invention.

Figure 5:
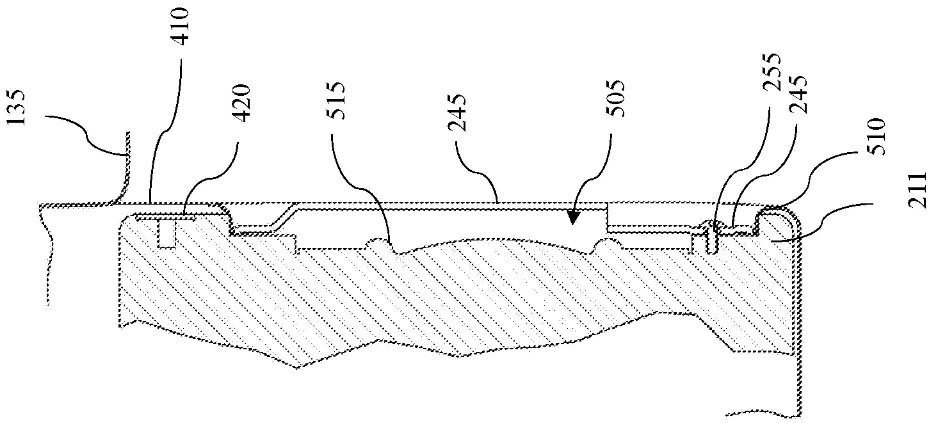

FIG. 5 is a diagonal cross-sectional side view of a portion of the speaker assembly coupled to the backpack taken along line 5 of FIG. 4. FIG. 5 illustrates how the speaker grilles facilitate coupling the speaker assembly to the backpack. In FIG. 5, the grille illustrated is the subwoofer grille 245. Similar means of attaching the tweeter grilles to the backpack may also is used. The speaker assembly is positioned inside the speaker compartment (illustrated as 207 in FIG. 2) of the backpack such that the subwoofers speakers 515 are positioned proximate to the side sections 130 of the backpack and the tweeter speakers are positioned proximate to the outward facing section 125 of the backpack. With the speaker assembly inside the speaker compartment of the backpack, each grille is positioned over a corresponding opening on the backpack material 510 of the backpack 105. In FIG. 5, 515 corresponds to the subwoofer of the speaker assembly. Next, fasteners 255, in this case threaded screws, are used to be inserted into threaded openings or bosses of the speaker assembly 211, thereby sandwiching the backpack material 510 between the speaker assembly 211 and the subwoofer grille 245 and thus securing the side section of the speaker assembly to the side sections of the backpack.

Similarly, fasteners 255 are used to be inserted into the threaded openings of the speaker assembly 211, thereby sandwiching the backpack material between the speaker assembly 211 and the tweeter grille 250, and thus securing the outward facing sections of the speaker assembly to the outward facing section of the backpack.

As mentioned above backpack may comprise material that is commonly used for fabricating backpacks including leather, nylon, canvas, polyester, plastics, polymers, cloth, fiber, wood or any combination thereof. Additionally, other materials may be used and are within the spirit and scope of the invention.

FIG. 6 is a block diagram illustrating the main electronic components of a system for a portable entertainment system, according to an example embodiment. Dashed line 605 represents the speaker housing. The components within the housing and the components outside the housing may be communicatively coupled with one another. Located inside the speaker housing is a processor 610. The processor is configured for processing the audio to be emitted from the subwoofers and tweeters of the system. The processor may include a signal processor, a digital processor, amplifier, etc. The ports and controls of the user interface station 650 is also communicatively coupled to the processor. The speaker assembly includes a battery or power source 640 inside the housing that is configured for providing electrical power to the speakers as well as for providing power to devices that may be plugged-in to the user interface station 650. As mentioned above, a user interface station is disposed on the housing. The user interface station includes a USB port, wherein the USB port is configured for interfacing with a USB connection and may provide charging to external devices such as cell phones, tablets, video cameras, etc. The user interface station may also include a charging port so that the battery 640 may be charged. The battery may also be connected to the speakers 660, tweeters and subwoofers, to provide power for emitting sound. Additionally, the battery may be also conductively connected to and configured to power the remote controlling device 620 and alarm controlling device 625. The remote controlling device and power controlling device are well known to those skilled in the art.

The remote controlling device 620 and the alarm controlling device 625 are positioned outside the speaker housing 605. Both the remote activating device and controlling device may be conductively coupled using insulated wiring. Additionally, the remote controlling device and the alarm controlling device may also be wirelessly in communication with the system. FIG. 6 also illustrates a mobile telephone, cellular telephone or smart phone 630 or tablet 635 that is in wireless communication with the processor 610. The cell phone was 630 or tablet 635 may also be used to wirelessly control the speaker assembly.

Figure 7:
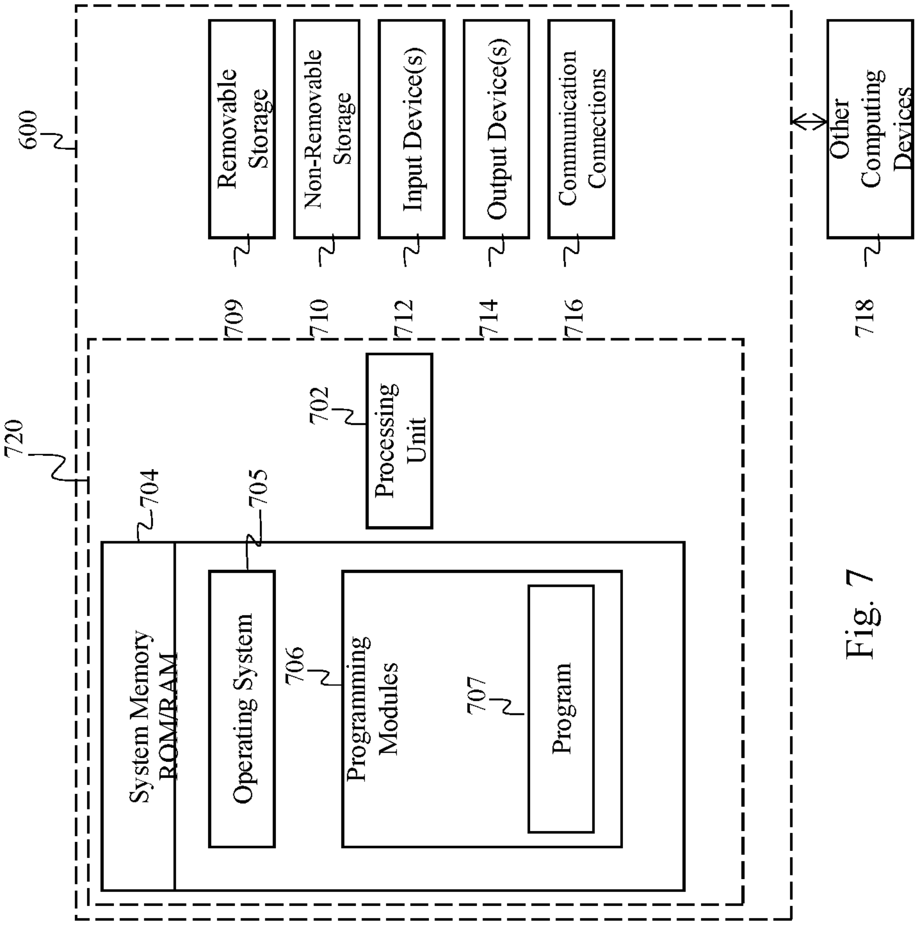

FIG. 7 is a block diagram of an example computing device or processor 700 and other computing devices. Consistent with the embodiments described herein, the aforementioned actions performed by processor 610 may be implemented in a computing device, such as the computing device 700 of FIG. 7. Any suitable combination of hardware, software, or firmware may be used to implement the computing device 700. The aforementioned system, device, and processors are examples and other systems, devices, and processors may comprise the aforementioned computing device.

With reference to FIG. 7, a system consistent with an embodiment of the invention may include a plurality of computing devices, such as computing device 700. In a basic configuration, computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination or memory. System memory 704 may include operating system 705, one or more programming modules 706 (such as program module 707). Operating system 705, for example, may be suitable for controlling computing device operation. In one embodiment, programming modules 706 may include, for example, a program module 707. Furthermore, embodiments of the invention may be practiced in conjunction with a graphics library, other operating systems, or any other application program and is not limited to any particular application or system. This basic configuration is illustrated in FIG. 7 by those components within a dashed line 720.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a camera, a touch input device, etc. Output device(s) 714 such as a display, speakers, a printer, etc. may also be included. The aforementioned devices are only examples, and other devices may be added or substituted.

Computing device 700 may also contain a communication connection 716 that may allow device 700 to communicate with other computing devices 718, such as over a network in a distributed computing environment, for example, an intranet or the Internet or wirelessly with devices 630 and 635. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), wireless communication includes wireless Bluetooth® technology, WIFI, infrared, and other wireless media. The term computer readable media as used herein may include both computer storage media and communication media.

As stated above, a number of program modules and data files may be stored in system memory 704, including operating system 705. While executing on processing unit 702, programming modules 706 may perform processes including performing sound processing functions such as signal processing, digital processing, etc. Computing device 702 may also include a graphics processing unit 703, which supplements the processing capabilities of processor 702 and which may execute programming modules 706, including all or a portion of those processes identified or alluded to above. The aforementioned processes are examples, and processing units 702, 703 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, thumb drives, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A portable entertainment and communications system comprising:

- a backpack comprising a main opening and a pair of straps, wherein the backpack is configured for a user to wear on the user's back;
- a lining inside the backpack, wherein the lining comprises an inward facing surface, and wherein the inward facing surface of the lining includes at least one compartment configured for receiving items;
- a speaker compartment positioned inside the backpack below the lining, wherein the speaker compartment is configured to receive a speaker assembly;
- a rectangular shaped speaker assembly positioned inside the speaker compartment and configured for producing audio, and wherein the speaker assembly is configured to be communicatively coupled with a remote computing device, and wherein the speaker assembly includes:

a rectangular shaped housing configured to be positioned inside the speaker compartment;

a subwoofer coupled to each side section of the housing, wherein each subwoofer is configured to emit sound out of each side section of the housing and not out of the outward facing section of the housing;

at least two tweeters coupled to an outward facing section of the housing, wherein each tweeter is configured to emit sound out of the outward facing section of the housing;

at least two air channels, wherein each channel is configured to allow air to flow between the inside and outside of the housing;

a processor inside the housing, wherein the processor is configured for processing audio to be emitted from the subwoofers and tweeters;

a user interface station disposed on the housing, wherein the user interface station includes a USB port, wherein the USB port is configured for interfacing with a USB connection, and a plurality of audio ports, wherein the audio ports are configured for receiving audio in and audio out connections; and, a battery inside the housing, wherein the battery is configured for providing electrical power;

a plurality of openings disposed on the backpack, wherein the openings are configured to align with the subwoofers, tweeters, and air channels;

a pair of subwoofer grilles, wherein each subwoofer grille covers one of the openings corresponding to one of the subwoofers of the speaker assembly, and wherein each subwoofer grille is configured to couple each side section of the speaker assembly to the side section of the backpack;

a pair of tweeter grilles, wherein each tweeter grille covers one of the openings corresponding to one of the tweeters of the speaker assembly, and wherein each tweeter grille is configured to couple the outward facing section of the speaker assembly to the outward facing section of the backpack;

a remote controlling device concealed within one of the straps of the backpack, wherein the remote controlling device is communicatively coupled with the processor of the speaker assembly inside the backpack, wherein the remote controlling device is configured for at least controlling the power and volume of the speakers, and wherein the remote controlling device is configured to be activated by applying force to a portion of the surface of the strap; and, an alarm controlling device concealed within one of the straps of the backpack, wherein the alarm controlling device is communicatively coupled with the processor of the speaker assembly inside the backpack, wherein the alarm controlling device is configured for activating an alarming sound emitted from said speakers, and wherein the alarm controlling device is configured to be activated by applying force to a portion of the surface of the strap.

2. The portable entertainment and communications system of claim 1, wherein an insulated wire communicatively couples the processor of speaker assembly with the remote controlling and alarm controlling devices.

3. The portable entertainment and communications system of claim 1, wherein the backpack further includes padding along the backward facing section of the backpack, wherein the padding is configured for absorbing vibrations emitted the subwoofers and tweeters.

4. The portable entertainment and communications system of claim 1, wherein the backpack further includes a main flap configured to cover the main opening, wherein the main flap comprises a first end opposing a second end, wherein the first end of the main flap is attached to an upper end of a backward facing surface of the backpack, and wherein the second end of the flap is configured to be removably attached to an outward facing surface of the backpack.

5. The portable entertainment and communications system of claim 1, wherein the main flap is configured to be removably coupled to a backward facing surface of the backpack by a buckle.

6. The portable entertainment and communications system of claim 1, wherein a slit in the backpack is configured to provide access to the user interface station.

7. The portable entertainment and communications system of claim 1, wherein lower end of the backpack comprises rounded corners along the downward facing surface of the backpack, wherein the rounded corners are configured to prevent damage to the surface of the backpack.

8. The portable entertainment and communications system of claim 1, wherein the wireless communication includes wireless Bluetooth® technology.

9. A backpack configured for providing a portable entertainment and communications system comprising:

a bag comprising a main opening and a pair of straps, wherein the bag is configured for a user to wear on the user's back;

a lining inside the bag, wherein the lining comprises an inward facing surface, and wherein the inward facing surface of the lining includes at least one compartment configured for receiving items;

a speaker compartment positioned inside the bag below the lining, wherein the speaker compartment is configured to receive a speaker assembly;

a plurality of openings disposed on the bag, wherein the openings are configured to align with subwoofers tweeters, air channels and docking station of a speaker assembly;

a pair of subwoofer grilles, wherein each subwoofer grille covers an opening, and wherein each subwoofer grille is configured to couple each side section of a speaker assembly to a side section of the bag; and, a pair of tweeter grilles, wherein each tweeter grille covers an opening, and wherein each tweeter grille is configured to couple an outward facing section of the speaker assembly to an outward facing section of the bag.

10. The backpack of claim 9, wherein the backpack further comprises:

a rectangular shaped speaker assembly positioned inside the speaker compartment and configured for producing audio, and wherein the speaker assembly is configured for wireless communication with a remote computing device, and wherein the speaker assembly includes:

a rectangular shaped housing configured to be positioned inside the speaker compartment;

a subwoofer coupled to each side section of the housing, wherein each subwoofer is configured to emit sound out of each side section of the housing and not out of an outward facing section of the housing;

at least two tweeters positioned on the outward facing section of the housing, wherein each tweeter is configured to emit sound out of the outward facing section of the housing;

at least two air channels, wherein each channel is configured to allow air to flow between the inside and outside of the housing;

a processor inside the housing, wherein the processor is configured for processing audio to be emitted from the subwoofers and tweeters;

a user interface station disposed on the housing, wherein the user interface station includes a USB port, wherein the USB port is configured for interfacing with a USB connection, and a plurality of audio ports, wherein the audio ports are configured for receiving audio in and audio out connections; and, a battery inside the housing, wherein the battery is configured for providing electrical power.

11. The backpack of claim 10, wherein the backpack further includes:

a remote controlling device concealed within one of the straps of the backpack, wherein the remote controlling device is communicatively coupled with the processor of the speaker assembly and is configured for at least controlling the power and volume of the speakers;

an alarm controlling device concealed within one of the straps of the backpack, wherein the alarm controlling device is communicatively coupled with the processor of the speaker assembly, wherein the alarm controlling is configured for controlling an alarming sound emitted from said speakers; and, wherein the remote computing device is configured for communicatively coupling with the processor of the speaker assembly, and wherein the processor of the speaker assembly is configured for amplifying sound data received by the remote computing device.

12. The backpack of claim 11, wherein an insulated wire communicatively couples the speaker assembly and the remote controlling and alarm controlling devices.

13. The backpack of claim 12, wherein the backpack further includes padding along a backward facing surface of the backpack, wherein the padding is configured for absorbing vibrations emitted the subwoofers and tweeters.

14. The backpack of claim 13, wherein the backpack further includes a main flap configured to cover the main opening, wherein the main flap comprises a first end opposing a second end, wherein the first end of the main flap is attached to an upper end of the backward facing section of the backpack, and wherein the second end of the flap is configured to be removably attached to outward facing surface of the backpack.

15. The backpack of claim 14, wherein the main flap is configured to be removably coupled to the backward facing section of the backpack by a buckle.

16. The backpack of claim 15, wherein a slit is configured to provide access to the user interface station.

17. The backpack of claim 16, wherein lower end of the backpack comprises rounded corners along the downward facing surface of the backpack, wherein the rounded corners are configured to prevent damage to the surface of the backpack.

18. The backpack of claim 17, wherein the remote computing device is configured for communicatively coupling with the processor of the speaker assembly, and wherein the processor of the speaker assembly is configured for amplifying sound data received by the remote computing device.

19. A portable entertainment and communications system comprising:

a backpack comprising a main opening and a pair of straps, wherein the backpack is configured for a user to wear on the user's back;

a partition inside the backpack, wherein the partition defines a speaker compartment positioned inside the backpack below the partition, wherein the speaker compartment is configured to receive a speaker assembly;

a plurality of openings disposed on the backpack below the partition, wherein the openings are configured to align with subwoofers tweeters, air channels and docking station of a speaker assembly, and wherein the speaker assembly is configured to emit sound out of each side section of the housing and out of the outward facing section of the housing;

a pair of subwoofer grilles, wherein each subwoofer grille covers one of the openings corresponding to one of the subwoofers of the speaker assembly, and wherein each subwoofer grille is configured to couple each side section of the speaker assembly to the side section of the backpack; and, a pair of tweeter grilles, wherein each tweeter grille covers one of the openings corresponding to one of the tweeters of the speaker assembly, and wherein each tweeter grille is configured to couple the outward facing section of the speaker assembly to the outward facing section of the backpack.

20. The portable entertainment and communications system of claim 19, wherein the backpack further includes:

a remote controlling device concealed within one of the straps of the backpack, wherein the remote controlling device is configured for communicatively coupling with a processor of the speaker assembly inside the backpack, wherein the remote controlling device is configured for at least controlling the power and volume of the speakers;

and, an alarm controlling device concealed within one of the straps of the backpack, wherein the alarm controlling device is conductively coupled with a processor of the speaker assembly inside the backpack, wherein the alarm controlling is configured for activating an alarming sound emitted from said speakers, and wherein the remote activating device is configured to be activated by pressing a portion of the surface of the strap.

* * * * *